US012562395B2

(12) United States Patent
Seshadri et al.

(10) Patent No.: US 12,562,395 B2
(45) Date of Patent: Feb. 24, 2026

(54) MICROBIAL ELECTROCHEMICAL CELL (MECC) FOR WASTE DEGRADATION

(71) Applicants: Kaushik Palicha, Tamil Nadu (IN); Harinipriya Seshadri, Tamil Nadu (IN)

(72) Inventors: Harinipriya Seshadri, Chengalpattu (IN); Savari Rathinam Sahaya Prabaharan, Pudupakkam (IN)

(73) Assignees: Kaushik Palicha, Tamil Nadu (IN); Harinipriya Seshadri, Tamil Nadu (IN)

( * ) Notice: Subject to any disclaimer, the term of this patent is extended or adjusted under 35 U.S.C. 154(b) by 517 days.

(21) Appl. No.: 18/019,220

(22) PCT Filed: Aug. 13, 2021

(86) PCT No.: PCT/IB2021/057460
§ 371 (c)(1),
(2) Date: Feb. 1, 2023

(87) PCT Pub. No.: WO2022/029749
PCT Pub. Date: Feb. 1, 2022

(65) Prior Publication Data

US 2023/0335769 A1 Oct. 19, 2023

(30) Foreign Application Priority Data

Aug. 3, 2020 (IN) ............................. 202041033271

(51) Int. Cl.
*H01M 8/16* (2006.01)

(52) U.S. Cl.
CPC .................................... *H01M 8/16* (2013.01)

(58) Field of Classification Search
CPC ....................................................... H01M 8/16
(Continued)

(56) References Cited

U.S. PATENT DOCUMENTS 7,531,080 B2 5/2009 Carson et al.
7,709,113 B2 5/2010 Logan et al.
(Continued)

FOREIGN PATENT DOCUMENTS

IN 381339 11/2021
WO 2001/004061 1/2001
(Continued)

OTHER PUBLICATIONS

Kadier et al. Microbial Electrolysis Cell (MEC): An Innovative Waste to Bioenergy and Value-Added By-product Technology, Bioelectrosynthesis, Ed. 1, vol. 4, 2020, pp. 95-128. Retrieved from https://www.researchgate.net/publication/342676585 (Year: 2020).*
Yossan et al. Hydrogen production in microbial electrolysis cells: Choice of catholyte, Int. J. of Hydrogen Energy, vol. 38, 2013, pp. 9619-9624. Retrieved from https://www.sciencedirect.com/science/article/pii/S0360319913012901 (Year: 2013).*
(Continued)

*Primary Examiner* — James M Erwin
(74) *Attorney, Agent, or Firm* — Finch & Maloney PLLC

(57) ABSTRACT

A microbial electrochemical cell for degrading waste materials into useful products and process of degradation thereof is described. The microbial electrochemical cell includes at least one compartment; at least two electrodes connected to an electrical source (A); the anode is disposed within an organic solvent (C) containing mixed and unsorted waste such as plastic, organic and inorganic wastes; one or more bacterial strains suspended within the organic solvent; the one or more bacterial strain form a biofilm (E) on the anode; the cathode is disposed in a redox mediator and buffer mixture (G); and a salt bridge or a membrane is provided to selectively transfer the ions between the organic solvent (C) containing the mixed and unsorted waste and the redox mediator and buffer mixture (G); where the waste material received within the anode chamber is transformed into an useful product.

8 Claims, 9 Drawing Sheets

Figure 1:
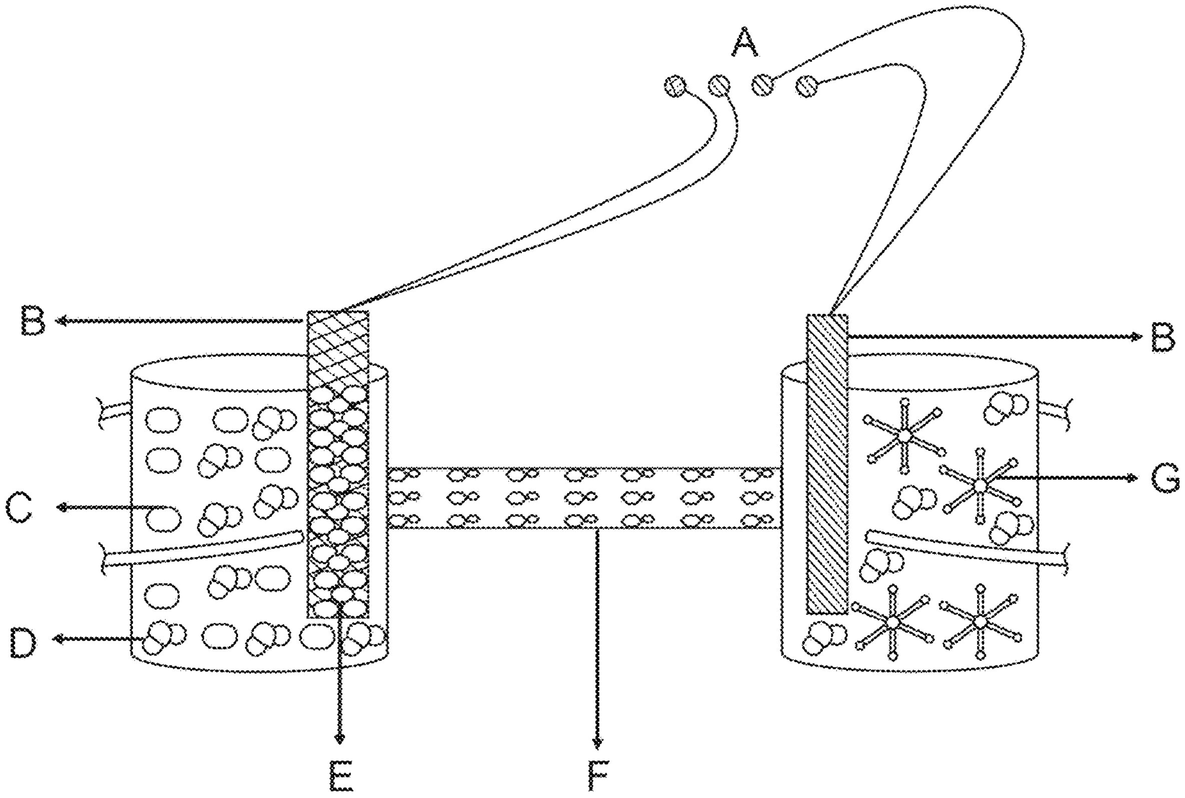

(58) Field of Classification Search
USPC ............................................................... 429/2
See application file for complete search history.

(56) References Cited

U.S. PATENT DOCUMENTS

| | | | | |
|---|---|---|---|---|
| 10,868,205 | B2 | 12/2020 | Vasylyev | |
| 2017/0288252 | A1* | 10/2017 | Gadhamshetty | C12M 43/00 |
| 2017/0362719 | A1* | 12/2017 | Borole | C12P 7/18 |
| 2019/0006694 | A1 | 1/2019 | Reguera et al. | |
| 2019/0119133 | A1 | 4/2019 | Jin et al. | |
| 2019/0322558 | A1* | 10/2019 | Goel | C02F 3/341 |
| 2020/0048661 | A1* | 2/2020 | Maiti | B01D 11/0492 |
| 2020/0080983 | A1* | 3/2020 | Ng | G01N 27/4167 |

FOREIGN PATENT DOCUMENTS

| | | |
|---|---|---|
| WO | 2017/198786 | 11/2017 |
| WO | 2022/029749 | 2/2022 |

OTHER PUBLICATIONS

Sun et al. Optimization of high-solid waste activated sludge concentration for hydrogen production in microbial electrolysis cells, Int. J. of Hydrogen Energy, vol. 39, 2014, pp. 19912-19920. Retrieved from https://www.sciencedirect.com/science/article/pii/S036031991402758X (Year: 2014).*

Speers et al. Fermentation of Glycerol into Ethanol in a Microbial Electrolysis Cell Driven by a Customized Consortium. Envi. Sci. & Tech., vol. 48, Iss. 11, 2014, pp. 6350-6358. Retrieved from https://pubs.acs.org/doi/full/10.1021/es500690a (Year: 2014).*

International Search Report mailed in PCT/IB2021/057460 dated Oct. 27, 2021.

Intimation of Grant and Recordal of Patent mailed in IN Application No. 202041033271 on Nov. 8, 2021.

First Examination Report mailed in IN Application No. 202041033271 on Jun. 22, 2021.

Reply to the First Examination Report in IN Application No. 202041033271 filed on Jul. 10, 2021.

* cited by examiner

MICROBIAL ELECTROCHEMICAL CELL (MECC) FOR WASTE DEGRADATION

CROSS REFERENCE TO RELATED APPLICATIONS

This application is a national stage application of international application No. PCT/IB2021/057460 entitled "MICROBIAL ELECTROCHEMICAL CELL (MECC) FOR WASTE DEGRADATION" which claims priority from Indian Patent Application number 202041033271 filed in provisional form on Aug. 3, 2020 and updated as a complete application on Mar. 7, 2021, entitled "A MICROBIAL ELECTROCHEMICAL CELL (MECC) FOR DEGRADATION OF WASTE MATERIALS INTO USEFUL PRODUCTS," and granted as Indian Patent No. 381339 on Nov. 8, 2021. Each of the above-identified applications are incorporated by reference herein in its entirety.

FIELD

The present disclosure relates to a Microbial Electrochemical Cell (MECC) for degrading waste materials into useful products. More specifically, the present disclosure relates to a MECC for degradation of plastic waste including polyester waste, acrylic waste, and mixed and unsorted organic, inorganic, plastic based waste.

Definition

As used in the present disclosure, the following term is generally intended to have the meaning as set forth below, except to the extent that the context in which they are used indicate otherwise.

Microbial Electrochemical Cell: The term "Microbial Electrochemical Cell" refers to a bio-electrochemical reactor system that drives an electric current by using microbes and a high-energy oxidant such as $O_2$ mimicking microbial interaction found in nature.

Microbial Electrochemical Cell (MECC) is a proven and promising device that can harvest energy and treat wastewater in a cost effective and sustainable manner (Chouler et al., 2016). MECCs consist of an anodic and a cathodic compartment that are generally separated by a salt bridge or a proton exchange membrane (PEM) to avoid the migration of electrolytes from one chamber to the other (Ho et al., 2018). Single or mixed culture bacteria act as a catalyst in the anodic compartment via formation of a biofilm on the anode. The biofilm breaks down the organic matter such as food waste, fruit waste, waste water, plastics such as Polyethylene terephthalate (PET), Polymethyl methacrylate (PMMA) so on and so forth to generate electrons and protons. Electrons are transferred to the cathode via an external circuit, while the protons diffuse through the salt bridge or PEM (Nimje et al., 2012; Mathuriya and Yakhmi, 2014; Miskan et al., 2016). In addition to breaking down the organic matter in anodic chamber, heavy metals, radionuclides & explosives can serve as terminal electron acceptors in the cathodic compartment and get electrochemically reduced and eventually be recovered from the cathode surface (Ucar et al., 2017).

Landfill: The terms 'landfill' or 'dump site' or 'dumpsite' and the like are used interchangeably.

Electrochemical perturbation: The term "Electrochemical perturbation" refers to potential or current or frequency impulses in cyclic manner applied to the MECC system via techniques such as Cyclic Voltammetry, Linear Sweep Voltammetry and Electrochemical Impedance as the case may be.

Uncultured bacterium: The term "uncultured bacterium" refers to most of the microbial species diversely present in nature that cannot be grown in laboratory with current technology Mixed culture bacteria: The term "mixed culture bacteria" refers to several species of bacterium present in the culture

BACKGROUND

The background information herein below relates to the present disclosure but is not necessarily prior art.

Several million tons of plastic waste is generated every year, and such plastic waste is disposed either by dumping the waste plastic into landfills, and/or by treating the waste plastic using pyrolysis and incineration. Pyrolysis of plastic waste produces a product consisting of heavy metals and dioxins, which makes the product unsuitable to use as a fuel. Incineration causes air pollution by releasing harmful gases into environment like dioxins. These conventional methods deposit heavy metals, Persistent Organic Pollutants (PoPs), ash waste residue and other toxins into the soil or air. Further, these pollutants also leach out slowly into the water sources on the earth surface as well as beneath the ground.

Polyethylene terephthalate (PET) and PolyMethyl Methacrylate (PMMA) are amongst the plastics that has its importance in routine industrial use. The production of PET and PMMA has been gradually increasing since its discovery. However, the chemical inertness of PET and PMMA makes it resistant to environmental degradation. PET, PMMA and other synthetic polymers as such are considered non-toxic, but the larger particles and micro-granules stay for longer time in marine or terrestrial habitats and accumulate in living-organisms. These large particles and micro-granules often act as carrier for potentially toxic colorants and additives.

The recycling of PET covers only a small fraction of PET waste and depends on the addition of large amount of pure polymer, and the process requires significant amount of energy. Further, the recycling of PET produces the downgraded lower value products. An alternative of recycling or degrading is to hydrolyze the PET using enzymes such as PETase at elevated temperatures to produce terephthalic acid (TPA) and ethylene glycol. Nevertheless, so far no enzyme technology led to full penetration and degradation of the thick layer of highly crystalline PET in a cost-effective and environment friendly manner.

Further, all the PET degrading enzymes known so far display $\alpha/\beta$-hydrolase fold. The monohydroxyethyl terephthalate (MHET)-degrading enzyme, MHETase is likely to possess a scaffold unprecedented for PET degrading enzyme. This feature of MHETase can be exploited to improve catalysis and to expand substrate specificity for PET degradation.

Recently, a bacterial species of *Ideonella* was discovered which can easily grow on low-crystallinity PET films. The PET degrading esterase, PETase from *Ideonella sakaiensis* showed higher enzyme activity at ambient temperatures and on high crystallinity PET as compared to the known PET-degrading enzymes. The PETase activity can be further improved by controlling the growth conditions of microbes which would increase the rate of PET degradation. Despite this, the long natural degradation time is a limiting factor.

Further, a MECC is a device that can convert chemical energy to electrical energy by using microorganisms. This electrochemical cell utilizes the microorganisms as catalyst on anode. The MECC is known for the generation of electricity. It can also be used as a biosensor to measure the solute concentrate of wastewater. Utilization of chemical process wastewater and synthetic wastewater in MECC to produce electricity is also known.

WO2017198786A1 discloses method of producing monomers and/or oligomers from a plastic product comprising at least one polyester, particularly polyethylene terephthalate and/or polylactic acid, comprising submitting the plastic product both to an amorphization step and to a depolymerization step.

US2019119133A1 discloses a process and device for expediting electron transfer and boost consequential oxidation and reduction reactions for destructing contaminants in water, wastewater, soil, and other water-containing and environmental matrices by combining power sources such as batteries, photo-active and semi-conducting materials, or the like with bio-electrochemical systems.

U.S. Pat. No. 10,686,205B2 discloses an electrochemical cell comprising an anode, a cathode and a reference electrode electronically connected to each other; a first biocatalyst comprising a consolidated bioprocessing and/or fermentative organism (e.g., a Cellulomonad, such as *Cellulomonasuda* (*C. uda*), or a *Clostridium* such as *Clostridium lentocellum* (*C. lentocellum*), *Clostridium cellobioparum* (*C. cellobioparum*), capable of processing and fermenting biomass (e.g., cellulosic-containing, polyol-containing, such as glycerin-containing water, etc.) to produce a biofuel and fermentation byproducts; and a second biocatalyst comprising an electricity-producing microorganism or electricigen (e.g., *Geobacter sulfurreducens*, (Gsu) or alcohol-tolerant Gsu (GsuA)) capable of transferring substantially all the electrons in the fermentation byproducts (e.g., hydrogen, one or more organic acids, or a combination thereof) to the anode electrode to produce electricity.

Conventional microbe treatment to degrade the PET waste on the water surface utilizes pre-treatment of the PET with PET degrading enzymes to obtain the intermediate products. These intermediate products are further treated with microbes in a controlled environment (temperature, humidity, pH etc.) for complete degradation of PET. However, in this process the industrially valuable intermediate products like TPA and ethylene glycol are also degraded into carbon dioxide and water.

Therefore, there is felt a need to develop a Microbial Electrochemical Cell for degrading the PET and PMMA waste that overcomes the above mentioned limitations.

OBJECTS

Some of the objects of the present disclosure, which at least one embodiment herein satisfies, are as follows.

An object of the present disclosure is to ameliorate one or more problems of the prior art or to at least provide a useful alternative.

A further object of the present disclosure is to provide a MECC for degrading waste materials including polyester waste, acrylic waste, and mixed and unsorted organic, inorganic, plastic based waste with no residual intermediates.

Another object of the present disclosure is to provide a Microbial Electrochemical Cell (MECC) for degrading plastic waste such as unsorted PET and PMMA.

Yet another object of the present disclosure is to provide a MECC which is environment friendly, cost effective and simple.

Still another object of the present disclosure is to provide a MECC which produces value-added products such as terephthalic acid (TPA) and ethylene glycol upon degradation of Polyethylene terephthalate (PET) waste materials; and Bicarbonates and Carbonates upon degrading PMMA wastes.

Other objects and advantages of the present disclosure will be more apparent from the following description, which is not intended to limit the scope of the present disclosure.

SUMMARY

The present disclosure provides a Microbial Electrochemical Cell (MECC) for degrading waste materials including plastic waste e.g. polyester waste, acrylic waste, and mixed and unsorted organic, inorganic, plastic based waste. The Microbial Electrochemical Cell comprises: at least one compartment; at least two electrodes, wherein at least one electrode is anode and at least one electrode is cathode, and the electrodes are connected to an electrical source (A); the anode is disposed within an organic solvent (C) containing plastic waste, wherein one or more bacterial strain is suspended within the organic solvent, wherein the one or more bacterial strain form an electrically conductive biofilm (E) on the anode; the cathode is disposed in a redox mediator and buffer mixture (G); and an electrical pathway is provided between the anode and the cathode to selectively transfer the ions between the organic solvent (C) containing plastic waste and the redox mediator and buffer mixture (G);

wherein the waste material received within the anode chamber is transformed into an organic compound.

BRIEF DESCRIPTION OF THE ACCOMPANYING DRAWINGS

The present disclosure will now be described with the help of the accompanying drawings, in which:

FIG. 1 illustrates a schematic representation of MECC for degrading Polyethylene terephthalate (PET) and Polymethyl Methacrylate (PMMA) waste in accordance to the present disclosure.

Figure 2:
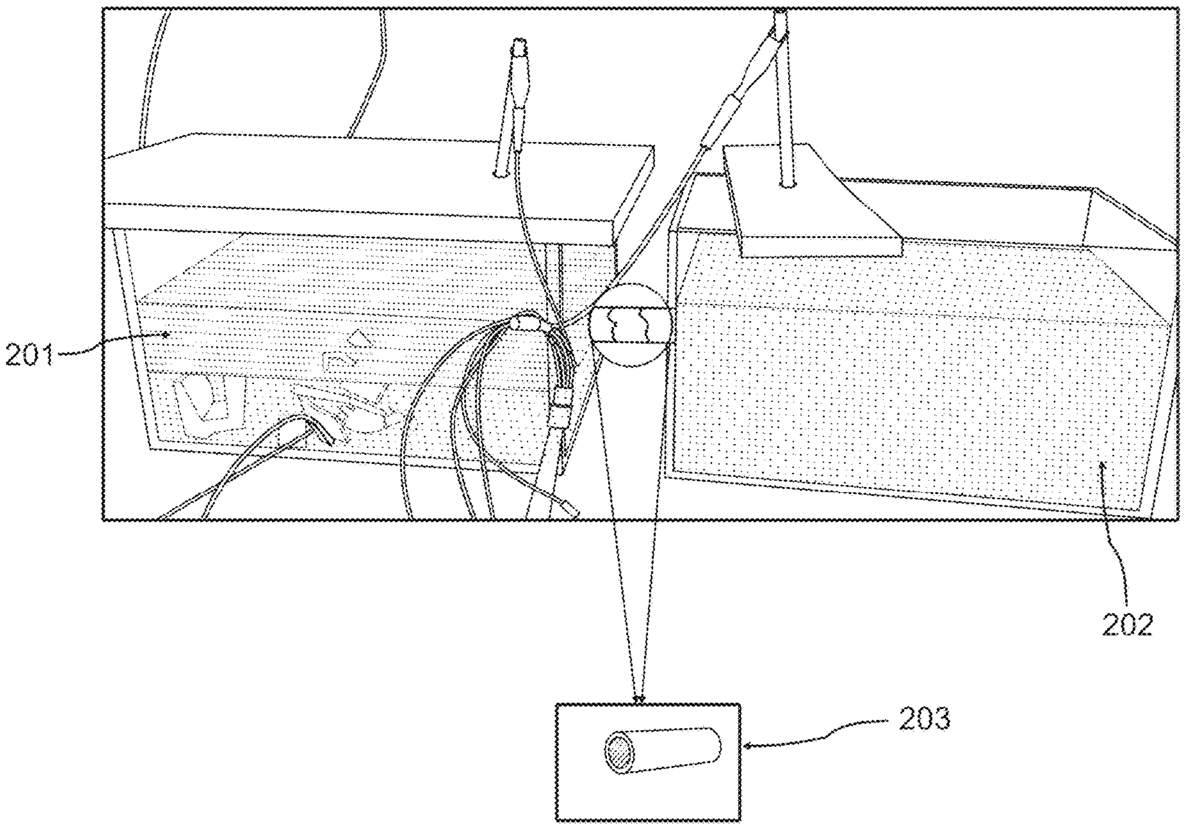

A—electrical source
B—graphite rod
C—organic solvent containing polyester waste, wherein one or more bacterial strain is suspended within the organic solvent
D—terephthalic acid and ethylene glycol
E—microbial biofilm
F—salt bridge
G—redox mediator and buffer mixture FIG. 2: Design of a working MECC degrading Polyethylene terephthalate (PET) waste. The blown up photo is that of a salt bridge connecting the two chambers of the MECC.

Figure 3:
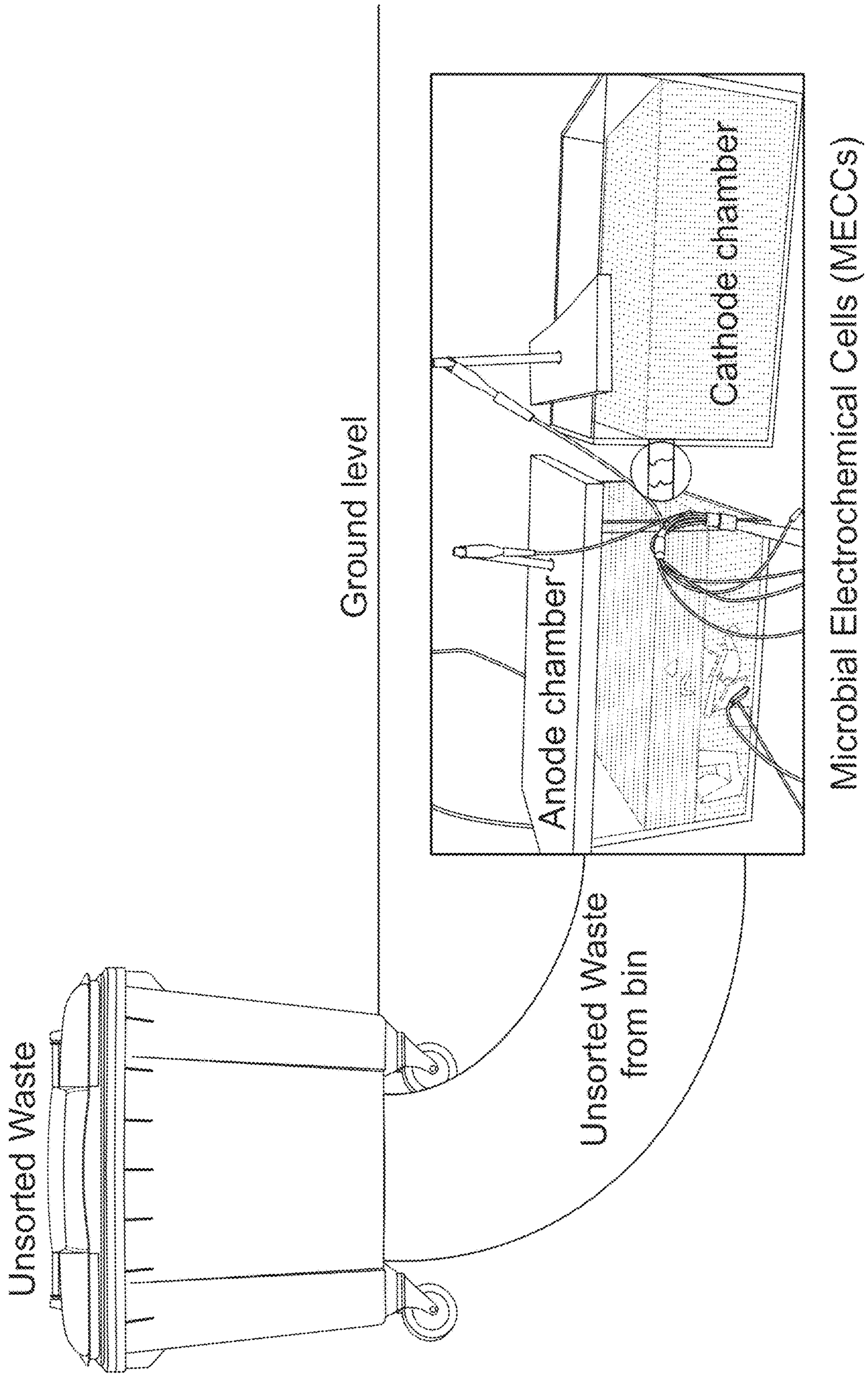

FIG. 3: Representative design of working MECC degrading unsorted waste, where the waste collecting bin is directly connected to the anodic chamber of the MECC located below ground level.

Figure 4:
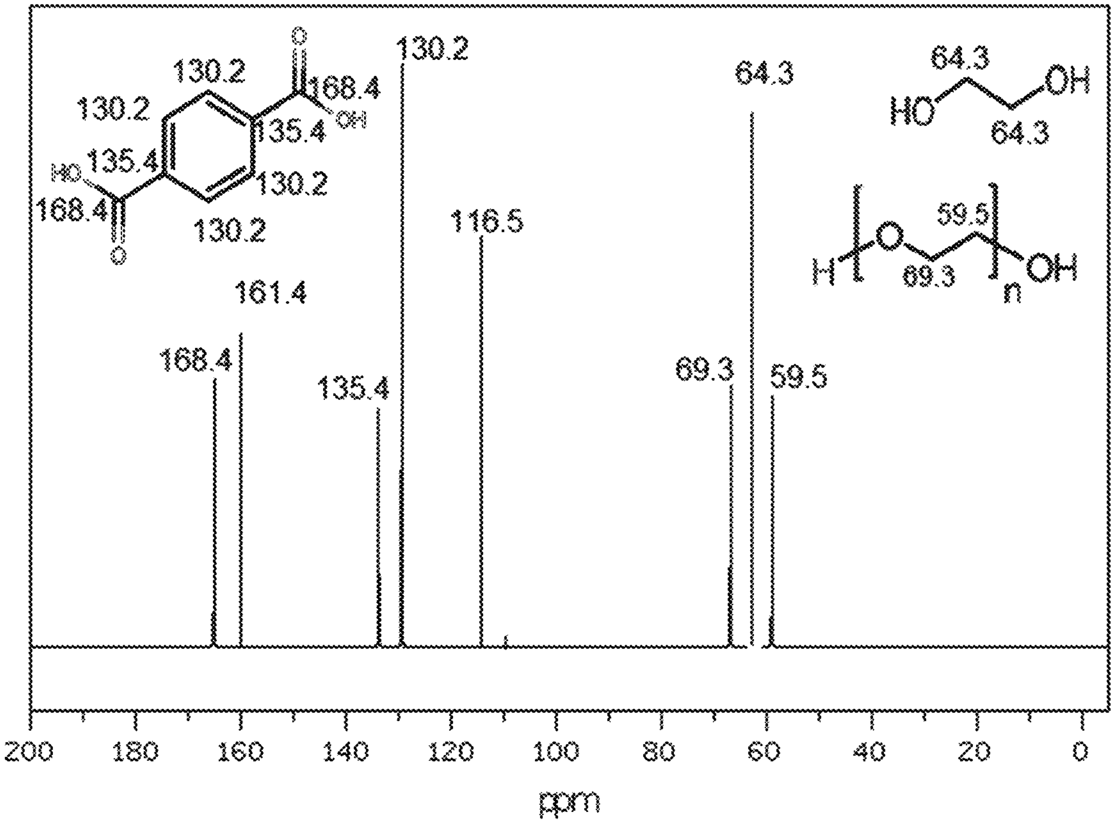
Figure 5:
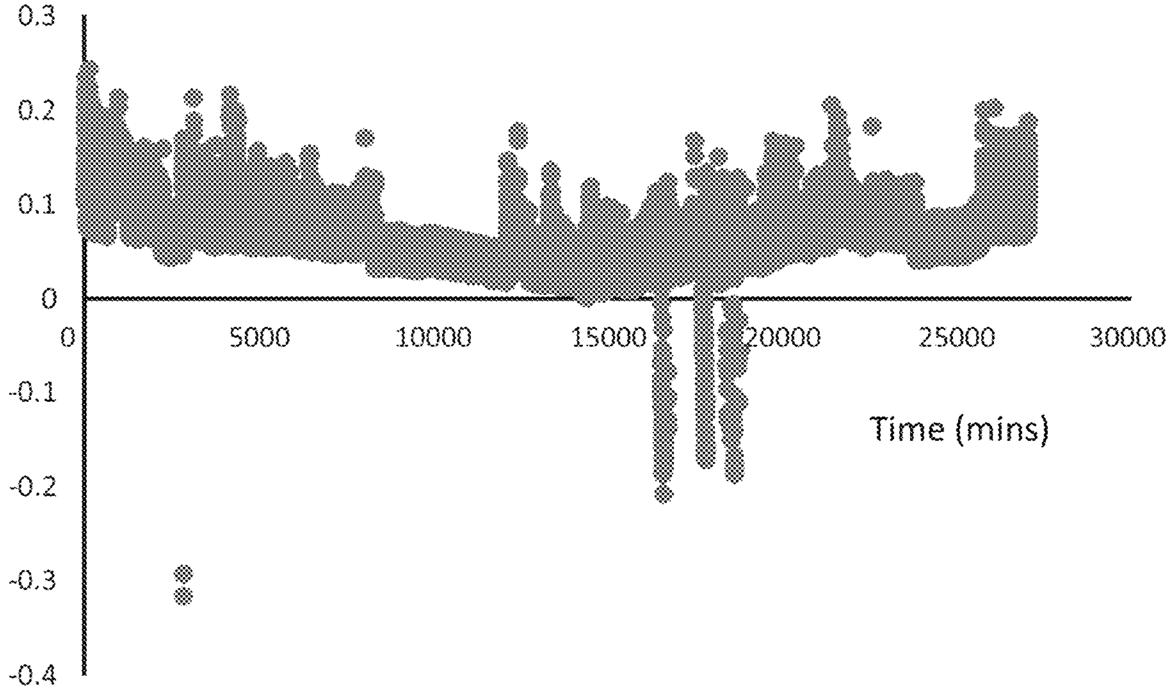

FIG. 4: 13 C NMR of degraded products of Polyethylene terephthalate (PET) waste in Trifluoro Acetic acid by MECC FIG. 5: Open Circuit Voltage (OCV) of MECC designed with Trifluoro Acetic acid solvent for degrading PET FIG. 6: 13 C NMR of degraded products of Polyethylene terephthalate (PET) waste in o-cresol by MECC FIG. 7: Open Circuit Voltage (OCV) of MECC designed with o-cresol solvent for degrading PET FIG. 8: 13C NMR of degraded products of Polyethylene terephthalate (PET) waste in saturated phenol by MECC FIG. 9: Open Circuit Voltage (OCV) of MECC designed in saturated phenol by MECC for degrading PET FIG. 10: 13C NMR of degraded products of PolyMethylMethacrylate (PMMA) waste in acetone by MECC FIG. 11: Open Circuit Voltage (OCV) of MECC designed in acetone for degrading PMMA FIG. 12A-12D: 16srRNA pie chart distribution of mixed culture bacteria in MECC (in TFA), MECC (in o-cresol) and MECC (in saturated Phenol)

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

The use of the expression "at least" or "at least one" suggests the use of one or more elements or ingredients or quantities, as the use may be in the embodiment of the disclosure to achieve one or more of the desired objects or results.

It is to be understood that wherein a numerical range is recited, it includes all values within that range, and all narrower ranges within that range, whether specifically recited or not.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that if any figures are provided herewith, they are for explanation purposes to persons ordinarily skilled in the art and that the drawings of them are not necessarily drawn to scale.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

In order to address the limitations of conventional plastic waste methods such as incineration, gasification, pyrolysis and plasma arc, a sustainable zero waste approach needs to be developed.

In an aspect, the present disclosure envisages a Microbial Electrochemical Cell (MECC) for degrading mixed and unsorted plastic, organic, inorganic waste into useful chemicals, wherein the MECC comprises an anode portion comprising at least one anode, a cathode portion comprising at least one cathode, wherein the anode and the cathode are connected to an electrical source (A); at least one anode is disposed within an organic solvent (C) containing said mixed and unsorted waste, wherein one or more bacterial strain is suspended within the organic solvent, wherein the one or more bacterial strain form an electrically conductive biofilm (E) on the anode; at least one cathode is disposed in a redox mediator and buffer mixture (G); and an electrical pathway between the anode portion and the cathode portion to selectively transfer the ions between the organic solvent (C) containing mixed and unsorted waste and the redox mediator and buffer mixture (G); wherein the mixed and unsorted waste received within the anode chamber is transformed into at least one useful compound. The electrical pathway between the anode and the cathode is preferably selected from a salt bridge or a membrane.

The plastic waste is selected from but not limited to polyester wastes, acrylic wastes, so on and so forth.

The organic waste is selected from but not limited to kitchen waste, food waste, fruit waste so on and so forth.

The inorganic waste is selected from but not limited to tannery effluents, heavy metal wastes, sewage wastes etc.

In another aspect, the present disclosure envisages a Microbial Electrochemical Cell (MECC) for degrading plastic waste. The microbial electrochemical cell comprises at least one compartment; at least two electrodes, wherein at least one electrode is anode and at least one electrode is cathode, and the electrodes are connected to an electrical source (A); the anode is disposed within an organic solvent (C) containing plastic waste, wherein one or more bacterial strain is suspended within the organic solvent, wherein the one or more bacterial strain form an electrically conductive biofilm (E) on the anode; the cathode is disposed in a redox mediator and buffer mixture (G); and an electrical pathway between the anode and the cathode to selectively transfer the ions between the organic solvent (C) containing plastic waste and the redox mediator and buffer mixture (G); wherein the plastic received within the anode chamber is transformed into an organic compound.

The one or more bacterial strain is allowed to grow in a pH range of 5.5 to 7 in the anode chamber via electrochemical perturbations.

A very low current is used as pulse current to stimulate the one or more bacterial strain to break down and consume the waste material dissolved in the solvent and grow as a biofilm on the graphite surface.

While the electrodes can be made of any suitable material known in the art, preferably they are graphite electrodes.

Redox mediators are chemicals with electrochemical activity. In a bio-electro-catalysis process, mediators may exchange electrons with fuels or oxidants at the reaction sites of the biocatalysts, and then diffuse to the surface of electrode and exchange electrons there. This process is repeated, and the mediator functions as an electron shuttle between the biocatalyst and electrode.

In accordance with the present disclosure, said redox mediator is selected from but not limited to Potassium Ferricyanide, Potassium dichromate, Potassium permanganate, Quinolidones, so on and so forth.

In accordance with the present disclosure, said buffer is any buffer known to the person skilled in the art to regulate the pH. An exemplary buffer is Potassium dihydrogen phosphate.

In accordance with the present disclosure, said microbial biofilm (E) is obtained from a species of *Geobacter* or *Shewanella* or *Achromobacter* or uncultured bacterium, or a mixed culture bacteria.

In accordance with the present disclosure, the solvent is selected from but not limited to acetone, saturated phenol, o-cresol, nitrobenzene, chlorobenzene, and trifluoroacetic acid (TFA). Preferably the solvent is selected from saturated phenol, o-cresol, and trifluoroacetic acid (TFA) for PET and acetone for PMMA.

In an aspect of the present invention, binary or ternary solvent mixtures may be used for mixed waste materials, chosen based on the solubility of individual waste materials or waste material groups. In an example, in case of mixed unsorted waste, binary solvents like Acetone/TFA, Acetone/o-cresol, Acetone/saturated Phenol and solvents of the like is utilized to dissolve the PET, PMMA and other mixed plastic wastes.

When a binary or a ternary solvent mixture is used, if the solvents are miscible, then the anode of the MECC is placed in the manner as described above. However, where the solvents in the binary or a ternary solvent mixture are immiscible, and creates a diffusion layer, then the anode needs to touch all the solvents by penetrating through the diffusion layer or diffusion layers.

In an embodiment of the present disclosure, the plastic waste is polyester waste.

In one aspect of the present disclosure, the polyester waste is selected from but not limited to polyethylene terephthalate (PET), PolyMethyl Methacrylate (PMMA), polytrimethylene terephthalate (PTT), polybutylene terephthalate (PBT), polyethylene isosorbide terephthalate (PEIT), polylactic acid (PLA), polyhydroxyalkanoate (PHA), polybutylene succinate (PBS), polybutylene succinate adipate (PBSA), poly butyleneadipate terephthalate (PBAT), polyethylene furanoate (PEF), polycaprolactone (PCL), poly(ethylene adipate) (PEA), polybutylene succinate terephthalate (PBST), polyethylene succinate (PES), poly(butylene succinate/terephthalate/isophthalate)-co-(lactate) (PBSTIL), and blends/mixtures of these materials, and preferably the polyester wastes are PET and PMMA.

In an embodiment of the present disclosure, FIG. 1 illustrates a schematic representation of MECC for degrading Polyethylene terephthalate (PET) waste in accordance to the present disclosure, wherein:

A—electrical source

B—graphite rod

C—organic solvent containing polyester waste, wherein a one or more bacterial strain is suspended within the organic solvent D—terephthalic acid and ethylene glycol E—microbial biofilm F—salt bridge G—redox mediator and buffer mixture In an embodiment of the present disclosure, the design of a working MECC degrading Polyethylene terephthalate (PET) waste is shown in FIG. 2.

The MECC is made up with a cathode chamber (202) and an anode chamber (201) connected by a salt bridge (203). Without departing from the scope of the invention, a membrane can also be used in place of the salt bridge. The anode chamber of MECC is filled with an appropriate organic solvent such as acetone, saturated phenol, o-cresol, nitrobenzene, chlorobenzene, trifluoroacetic acid (TFA) in which the plastic waste or other waste material is allowed to dissolve by heating the glass tub filled with the plastic waste or other waste materials immersed in the solvent to a suitable temperature in order to effect the dissolution of the waste. Once all the plastic or other waste materials are dissolved, the solution is allowed to cool to room temperature. The cathode chamber of the MECC is filled with 1M aqueous solution of electron acceptors such as Potassium Ferricyanide, Potassium dichromate, Potassium permanganate, Quinolidones etc. Graphite rod is preferably used as the electrode material. The mixed culture of anaerobic bacteria collected from plastic and other waste dump yard in Chengalpattu, Tamilnadu, India is added as inoculum in the anode chamber. The mixed culture is allowed to grow in the anode chamber via electrochemical perturbations. A very low current of about 1 mA is used as pulse current to stimulate the bacterial culture to break down the chemical bonds of plastic or other waste materials dissolved in the solvent, consume them, and grow as a biofilm on the anode surface. The open circuit voltage (OCV) of the MECC is continuously monitored after the external current applied to understand the growth and effect of growth of bacterial culture on the PET and PMMA degradation. When the OCV was observed to be Zero, it signifies that the bacterial action is about to stop, which in turn indicates that the waste degradation is coming to an end. When the OCV was observed to be negative, it signifies that the bacterial action is stopped, which in turn indicates that the waste degradation is completed.

In accordance with the present disclosure, the design of the compartments can include, but is not limited to, a single chamber and a dual chamber. The compartments can be made up of glass bottles or tubes. Other suitable designs and materials can also be used.

In accordance with the present disclosure, the buffer solution for the cathode compartment can include, but is not limited to, mild acidic or basic or neutral buffer. Other suitable known buffers can also be used.

Suitable buffers in the cathode compartment can include potassium dihydrogen phosphate, or mixtures thereof.

In accordance with the present disclosure, the electrochemical pathway between the anode and cathode compartments can be selected from, but is not limited to a salt bridge or a membrane. The ingredients of salt bridge can include, but is not limited to agar-agar solution and potassium chloride (KCl) solution, or agar-agar solution and Sodium chloride (NaCl) solution. Other suitable ingredients as salt bridge can also be used. However a salt bridge of Agar-agar (KCl) or Agar-agar (NaCl) is preferred because the agar-agar medium is suitable for bacteria to grow.

In accordance with the present disclosure, the one or more bacterial strain used in the biofilm can include, but is not limited to a species of *Geobacter* or *Shewanella* or *Achromobacter* or uncultured bacterium, or a mixed culture bacteria. Other suitable microorganisms can also be used.

In an embodiment of the present disclosure, the one or more bacterial strain used in the biofilm is a mixed culture bacteria from the landfill of Chengalpattu (comprising *Geobacter* or *Shewanella* or uncultured *Clostridium* or *Achromobacter*).

The mixed culture of bacteria is found to be gram negative, non-pathogenic, anaerobic and rod-shaped. Thus, replenishing of bacterial culture as inoculum is easy and can be performed using simple petri-dish experiments. Further, the pH control of the medium is not strictly required as it can be grown in a wide pH range of 5.5 to 10.0. The bacterium involves in NADP to NADPH reduction cycle and protonates the polymer back bone of the plastic wastes. The protonated polymer back bone is degraded into fragments and further oxidized to products such as Terephthalic acid (TPA) and Ethylene Glycol (EG), bicarbonates and carbonates.

In an embodiment, the step-wise reaction which is involved in the Microbial Electrochemical Cell (MECC) in accordance with the present disclosure is as follows:

The MECC in accordance with the present disclosure works on the principle of electrochemical perturbation of bacterium causing the release of enzymes at higher rate.

In accordance with the present disclosure, the working conditions of the MECC can be controlled externally by modifying the scan rate of the applied current or voltage to obtain ethylene glycol, TPA and other products as per the requirement. Ethylene glycol and TPA act as the energy source for the bacterium (For instance, a species of *Geobacter, Shewanella*, uncultured *Clostridium, Achromobacter*) to grow and complete their Nicotinamide Adenine Dinucleotide Phosphate ($NADP^+$) to NADPH (reduced form of $NADP^+$) process. But by controlled growth of the biofilm on the surface of anode, excess ethylene glycol and TPA generated by degradation of Polyethylene terephthalate (PET) can be separated from the anodic chamber of the MECC by inhibiting the absorption of ethylene glycol and TPA via electrical impulses on the electrode.

a

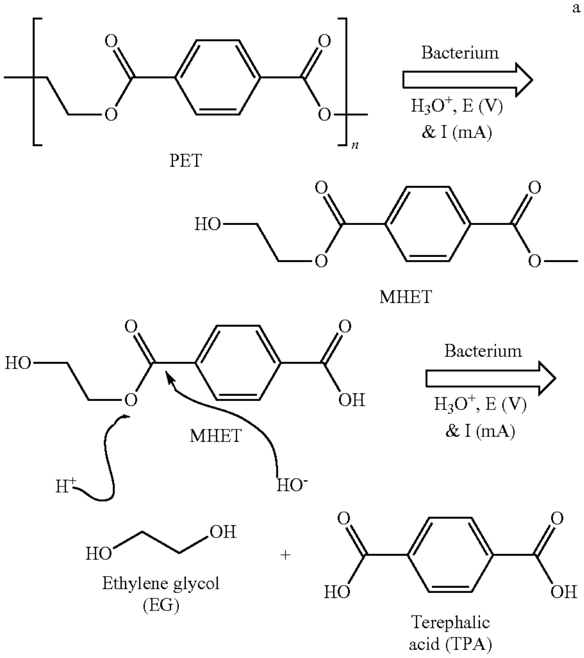

PET
MHET
MHET
Ethylene glycol (EG)
Terephalic acid (TPA)

b

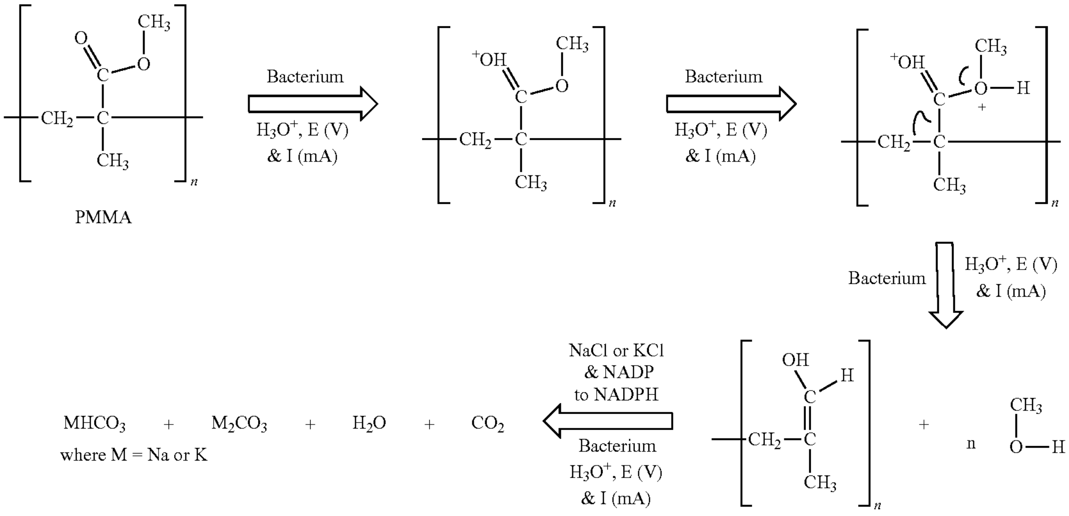

PMMA $MHCO_3$ + $M_2CO_3$ + $H_2O$ + $CO_2$
where M = Na or K

As shown in FIG. 3, the unsorted waste can be dropped into the waste bin, which is connected to the anodic chamber of MECC. The MECC is filled with appropriate organic solvent and as the waste falls in to the anodic chamber, it dissolves the plastic waste and spontaneously starts degrading the mixed waste into value added products.

EXAMPLES

The present disclosure will now be explained in further detail by the following examples. These examples are illustrative of certain embodiments of the invention without limiting the scope of the present invention.

Example 1

Design of Microbial Electrochemical Cells to Degrade PET Wastes

Two Glass tubs of 5 liters capacity each are taken, and at the lower part of a side of each tub, a hole of approximately 5 cm is made using a diamond cutter. A PVC tube (or a glass tube also can be used) of diameter 4.5 cm and 15 cm long is taken and filled with agar-agar gel saturated with KCl solution and allowed to solidify. The two ends of the agar-agar (KCl) filled PVC pipe is inserted about 3 mm into the drilled holes of the two glass tubs. The drilled hole on each glass tub with the respective inserted end of the agar-agar (KCl) filled PVC tube are sealed using an insulating chemical mixture sealant made of polyurethane resin base, diisodecylphthalate, xylene, calcium oxide, ethylbenzene and diphenyl methane 4,4_diisocyanate. In separate experiments, the anode chamber of MECC is filled with different organic solvents, i.e. trifluoroacetic acid (TFA) in the first experiment, o-cresol in the second experiment, and saturated phenol in the third experiment, in which the PET is allowed to dissolve by heating the glass tub filled with PET immersed in the solvent at 65°-85° C. Once the entire PET added is dissolved, the solution is allowed to cool to room temperature. In the fourth experiment, acetone is used as solvent to dissolve PMMA. In case of mixed unsorted waste, binary solvents like Acetone/TFA, Acetone/o-cresol, Acetone/saturated Phenol and solvents of the like is utilized to dissolve the PET, PMMA and other plastic wastes. The cathode chamber of the MECC is filled with 1M aqueous solution of electron acceptors such as Potassium Ferricyanide, Potassium dichromate, Potassium permanganate, Quinolidones etc. Graphite rod of 30 mm length and 10 mm diameter is used as electrode. The mixed culture of bacteria collected from plastic and other waste dump yard in Chengalpattu, Tamilnadu, India is added as inoculum in the anode chamber. The mixed culture is allowed to grow in the anode chamber via electrochemical perturbations. A very low current of 1 mA is used as pulse current to stimulate the bacterial culture to break down the chemical bonds of PET dissolved in the solvent, consume them and grow as a biofilm on the graphite surface. The Open Circuit Voltage (OCV) of the MECC is continuously monitored after the external current applied to understand the growth and effect of growth of bacterial culture on the PET and PMMA degradation.

Example 1.1

Organic Solvent in the Anode Chamber is Trifluoroacetic Acid (TFA)

In the Design of Microbial Electrochemical Cells to degrade PET wastes, trifluoroacetic acid (TFA) was used as the organic solvent in the anode chamber. A constant 1 mA pulse current was applied to the MECC in order for the bacteria to break down the chemical bonds of PET, consume them, and grow as a biofilm on the anode. The OCV in the beginning was observed to be 0.26 volts, which signifies that the bacterial action is yet to start. After 10 days, the OCV was observed to be Zero, which signifies that the bacterial action is about to stop, which in turn indicates that the PET waste degradation is coming to an end. After 20 days, the OCV was observed to be negative, which signifies that the bacterial action is stopped, which in turn indicates that the PET waste degradation is completed.

Example 1.2

Organic Solvent in the Anode Chamber is o-Cresol

In the Design of Microbial Electrochemical Cells to degrade PET wastes, o-cresol was used as the organic solvent in the anode chamber. A constant 1 mA pulse current was applied to the MECC in order for the bacteria to break down the chemical bonds of PET, consume them, and grow as a biofilm on the anode. The OCV in the beginning was observed to be 0.23 volts, which signifies that the bacterial action is yet to start. After 4 days, the OCV was observed to be 25 mV, which signifies that the bacterial action is about to stop, which in turn indicates that the PET waste degradation is coming to an end. After 5 days, the OCV was observed to be negative, which signifies that the bacterial action is stopped, which in turn indicates that the PET waste degradation is ended.

Example 1.3

Organic Solvent in the Anode Chamber is Saturated Phenol

In the Design of Microbial Electrochemical Cells to degrade PET wastes, saturated phenol was used as the organic solvent in the anode chamber. A constant 1 mA pulse current was applied to the MECC in order for the bacteria to break down the chemical bonds of PET, consume them, and grow as a biofilm on the anode. The OCV in the beginning was observed to be 0.21 volts, which signifies that the bacterial action is yet to start. After 6 days, the OCV was observed to be 0.3 volts, which signifies that the bacterial action is vigorous, which in turn indicates that the PET waste degradation is active. After 14-15 days, the OCV drops to 0.1 Volts, which signifies that the bacterial action is reduced, this in turn indicates that the PET waste degradation is completed.

Experimental Details and Analysis

13C NMR Analysis of products obtained by microbial degradation of Polyethylene terephthalate (PET) employing Microbial Electrochemical cell (MECC)

13C NMR Analysis of Products for PET Degradation Done in Trifluoroacetic Acid (TFA) and Mixed Culture Bacteria as in Example 1.1

FIG. 4 shows 13C NMR analysis of products for PET degradation done in trifluoroacetic acid and mixed culture bacteria from the plastic dump site of Chengalpattu, Tamilnadu, India.

The peaks at 64.3 ppm is identified as that of ethylene glycol.

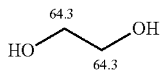

Since both the carbons are in the same environment, a high intensity peak at 64.3 ppm confirms the presence of ethylene glycol.

The satellite peaks at 59.5 and 69.3 ppm are attributed to the polymer of ethylene glycol (polyethylene glycol, PEG).

The single peak at 116.5 ppm is due to the presence of solvent trifluoro acetic acid (TFA) in which the PET is dissolved. Although, the solvent can also be degraded by microbes such as *Pseudomonas*, since we did not allow the process to take place for a longer time (at least 90 days) the solvent was not degraded by the microbes whereas the PET dissolved in Trifluoroacetic acid (TFA) is degraded into products such as ethylene glycol, polyethylene glycol and terephthalic acid. The degradation of PET took place in 20 days of dissolving PET in trifluoroacetic acid (TFA) and adding the microbes from the plastic landfill. The open circuit voltage of the MECC is recorded for all the 20 days and provided in FIG. 5. As the MECC stopped performing after 20 days (OCV became negative), the experiment was stopped and the products were analyzed.

13C NMR Analysis of Products for PET Degradation Done in o-Cresol and Mixed Culture Bacteria as in Example 1.2

Figure 6:
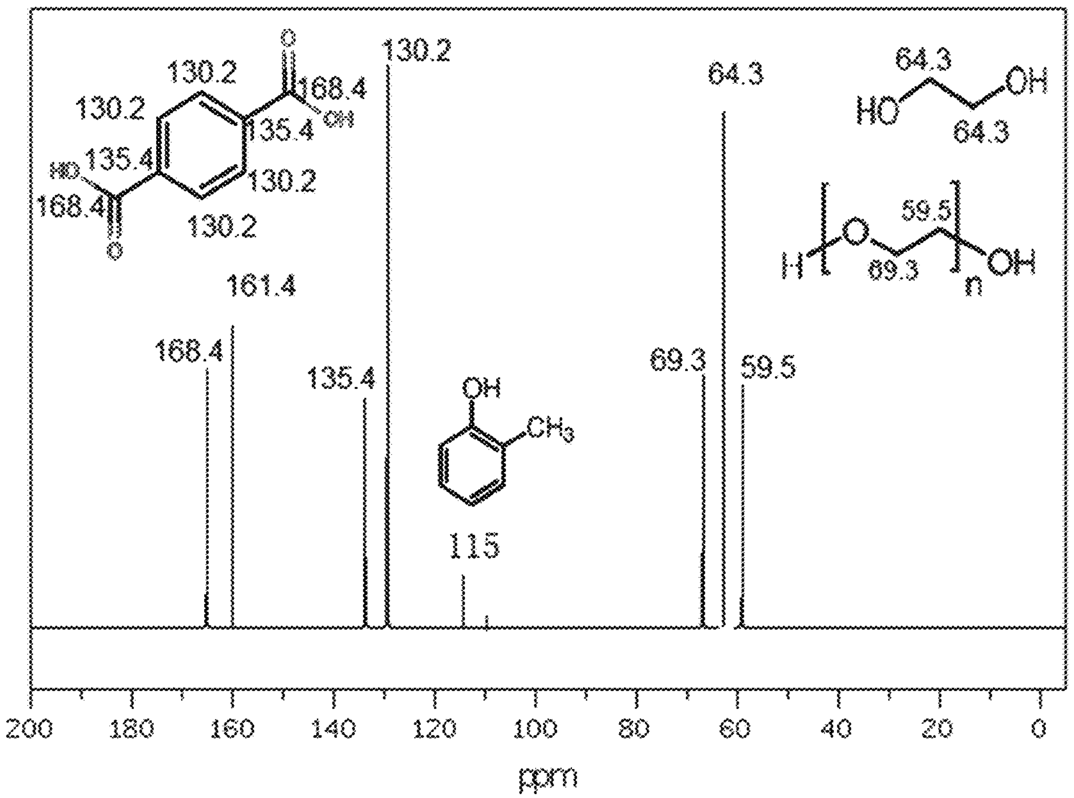
Figure 7:
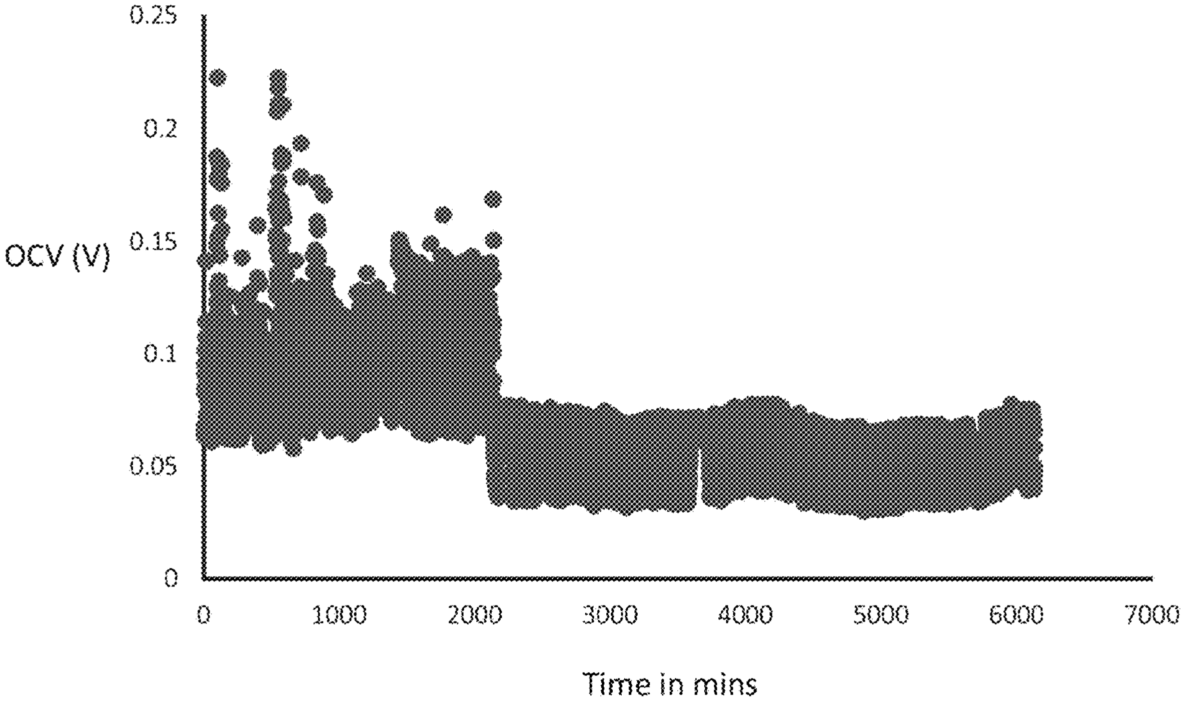

FIG. 6 shows 13C NMR analysis of products for PET degradation done in o-cresol (at 85° C.) and mixed culture bacteria from the plastic dump site of Chengalpattu, Tamilnadu, India The peaks at 64.3 ppm is identified as that of ethylene glycol.

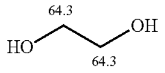

Since both the carbons are in the same environment, a high intensity peak at 64.3 ppm confirms the presence of ethylene glycol. The single low intensity peak at 115 ppm is due to the presence of o-cresol in which the PET is dissolved at 85° C. The solvent is almost completely degraded by microbes along with PET into products such as ethylene glycol, polyethylene glycol, terephthalic acid, bicarbonate and carbonate salts. The degradation of PET took place in 4-5 days of dissolving PET in o-cresol and adding microbes from the plastic landfill. The open circuit voltage of the MECC is recorded for all the 4-5 days and provided in FIG. 7. As the MECC stopped performing after 4-5 days (OCV became negative), the experiment was stopped and the products were analyzed.

13C NMR Analysis of Products for PET Degradation Done in Saturated Phenol and Mixed Culture Bacteria as in Example 1.3

Figure 8:
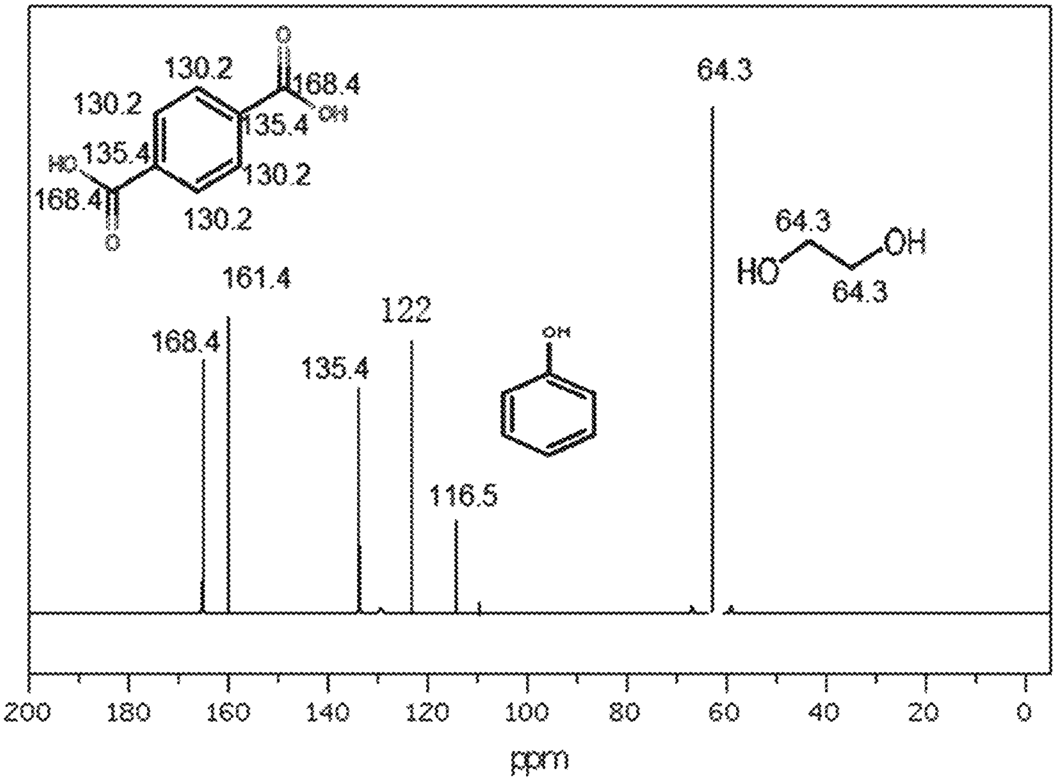
Figure 9:
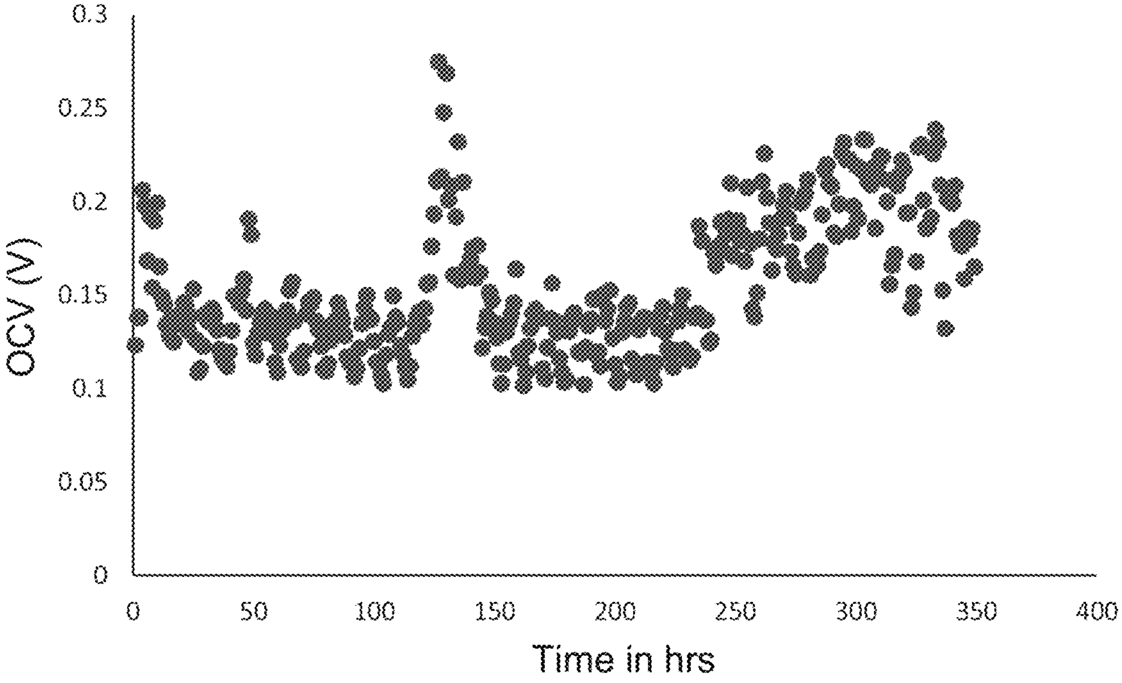

FIG. 8 shows 13C NMR analysis of products for PET degradation done in saturated phenol and mixed culture bacteria from the plastic dump site of Chengalpattu, Tamilnadu, India.

The peaks at 64.3 ppm is identified as that of ethylene glycol.

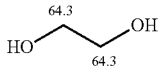

Since both the carbons are in the same environment, a high intensity peak at 64.3 ppm confirms the presence of ethylene glycol.

The peaks at 116.5 and 122 ppm are due to the presence of solvent saturated phenol in which the plastic is dissolved. PET dissolved in saturated Phenol is degraded into products such as ethylene glycol and terephthalic acid. The degradation of PET took place in 14-15 days of dissolving PET in saturated phenol and adding microbes from the plastic landfill. The open circuit voltage of the MECC is recorded for all the 14-15 days and provided in FIG. 9. As the MECC stopped performing after 15 days (OCV became negative), the experiment was stopped and the products were analyzed.

Example 2

Design of Microbial Electrochemical Cells to Degrade Acrylic Wastes

Two Glass tubs of 5 liters capacity each are taken, and at the lower part of a side of each tub, a hole of approximately 5 cm is made using a diamond cutter. A glass tube or PVC tube of diameter 4.5 cm and 15 cm long is taken and filled with agar-agar gel saturated with KCl solution and allowed to solidify. The two ends of the agar-agar (KCl) filled PVC pipe is inserted about 3 mm into the drilled holes of the two glass tubs. The drilled hole on each glass tub with the respective inserted end of the agar-agar (KCl) filled PVC pipe are sealed using an insulating chemical mixture sealant made of polyurethane resin base, diisodecyl phthalate, xylene, calcium oxide, ethylbenzene and diphenyl methane 4,4_diisocyanate. In separate experiments, the anode chamber of MECC is filled with different organic solvents, i.e. acetone in the experiment, in which the acrylic waste is allowed to dissolve by heating the glass tub filled with acrylic waste immersed in the solvent at room temperature. Once all the acrylic waste added is dissolved, the solution is allowed to react with mixed culture bacteria. The cathode chamber of the MECC is filled with 1M aqueous solution of electron acceptors such as Potassium Ferricyanide, Potassium dichromate, Potassium permanganate, Quinolidones etc. Graphite rod of 30 mm length and 10 mm diameter is used as electrode. The mixed culture of anaerobic bacteria collected from plastic and other waste dump yard in Chengalpattu, Tamilnadu, India is added as inoculum in the anode chamber. The mixed culture is allowed to grow in the anode chamber via electrochemical perturbations. A very low current of 1 mA is used as pulse current to stimulate the bacterial culture to break down the chemical bonds of acrylic waste dissolved in the solvent, consume them, and grow as a biofilm on the graphite surface. The open circuit voltage (OCV) of the MECC is continuously monitored after the external current applied to understand the growth and effect of growth of bacterial culture on the acrylic waste degradation.

Example 2.1

Organic Solvent in the Anode Chamber is Acetone

In the Design of Microbial Electrochemical Cells to degrade acrylic wastes, acetone was used as the organic solvent in the anode chamber. A constant 1 mA pulse current was applied to the MECC in order for the bacteria to break down the chemical bonds of acrylic waste, consume them, and grow as a biofilm on the anode. The OCV in the beginning was observed to be 0.26 volts, which signifies that the bacterial action has commenced. After 6 days, the OCV was observed to be Zero, which signifies that the bacterial action is about to stop, which in turn indicates that the acrylic waste degradation is coming to an end.

Experimental Details and Analysis

13CNMR analysis of products obtained by microbial degradation of Polymethyl methacrylate (PMMA) employing Microbial Electrochemical Cells (MECC)

13C NMR analysis of the products for PMMA degradation done in acetone and mixed culture bacteria as in Example 2.1.

Figure 10:
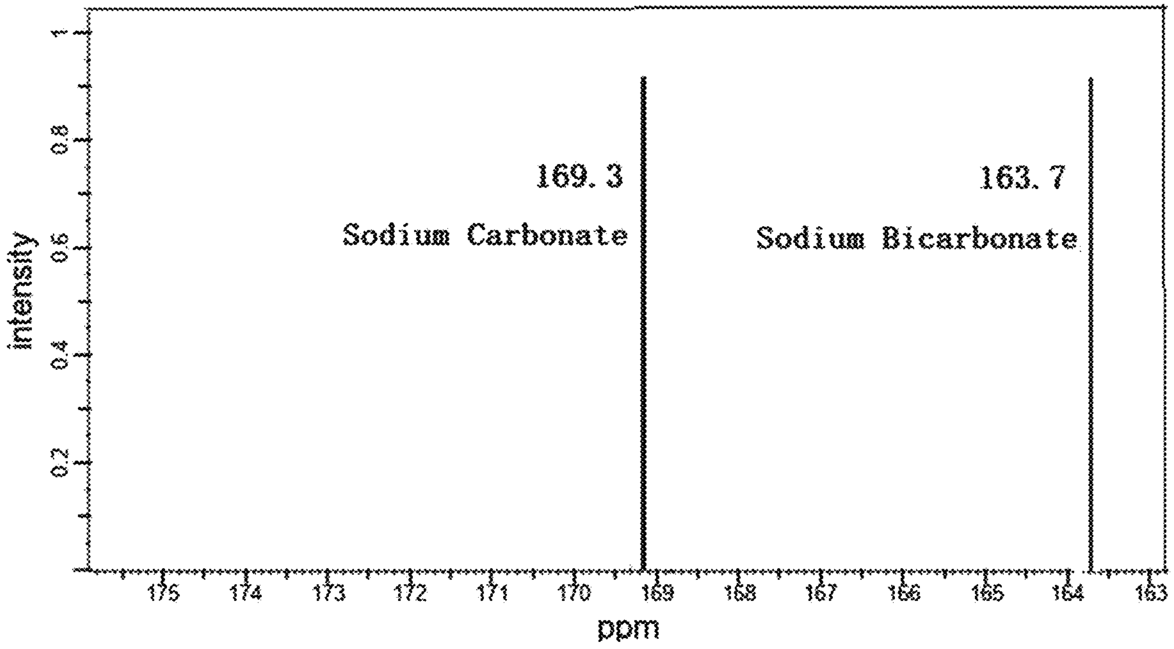

FIG. 10 shows 13C NMR analysis of products for PMMA degradation done in acetone and mixed culture bacteria from the plastic dump site of Chengalpattu, Tamilnadu.

Figure 11:
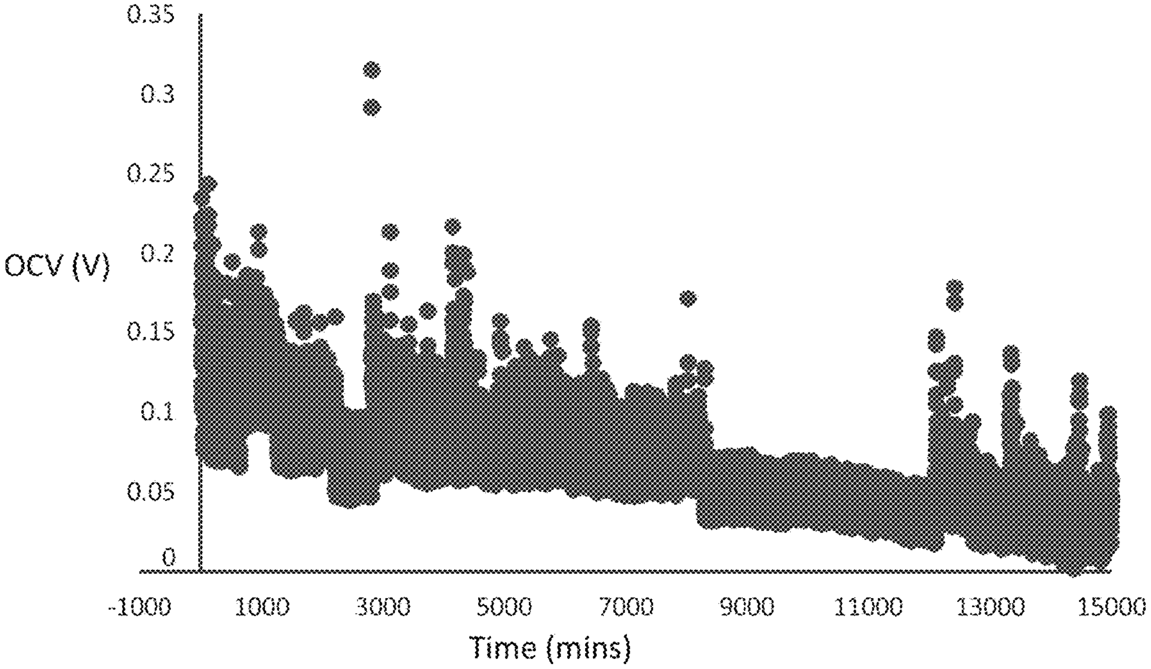
Figure 12A:
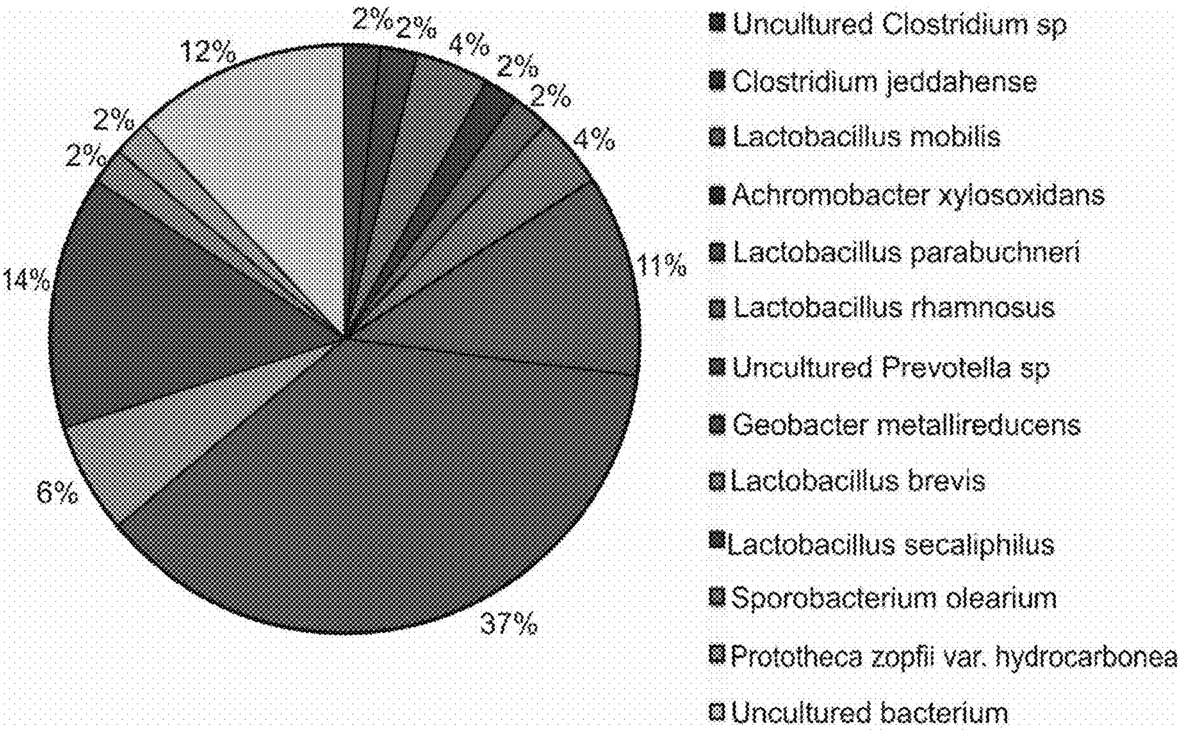
Figure 12B:
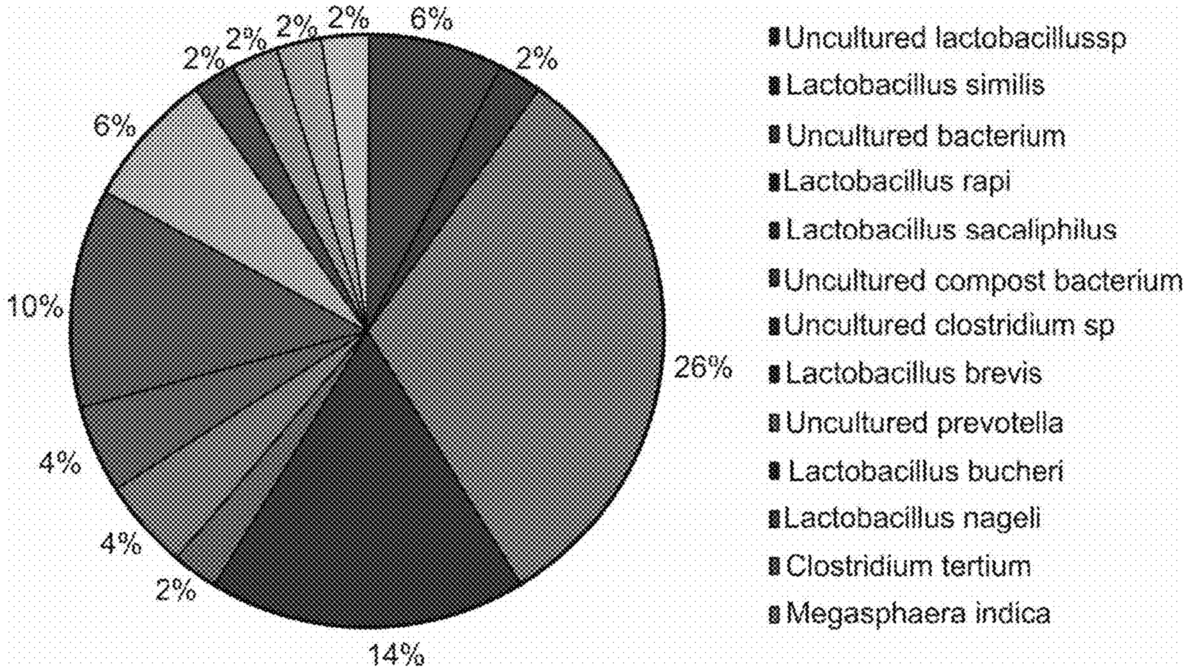
Figure 12C:
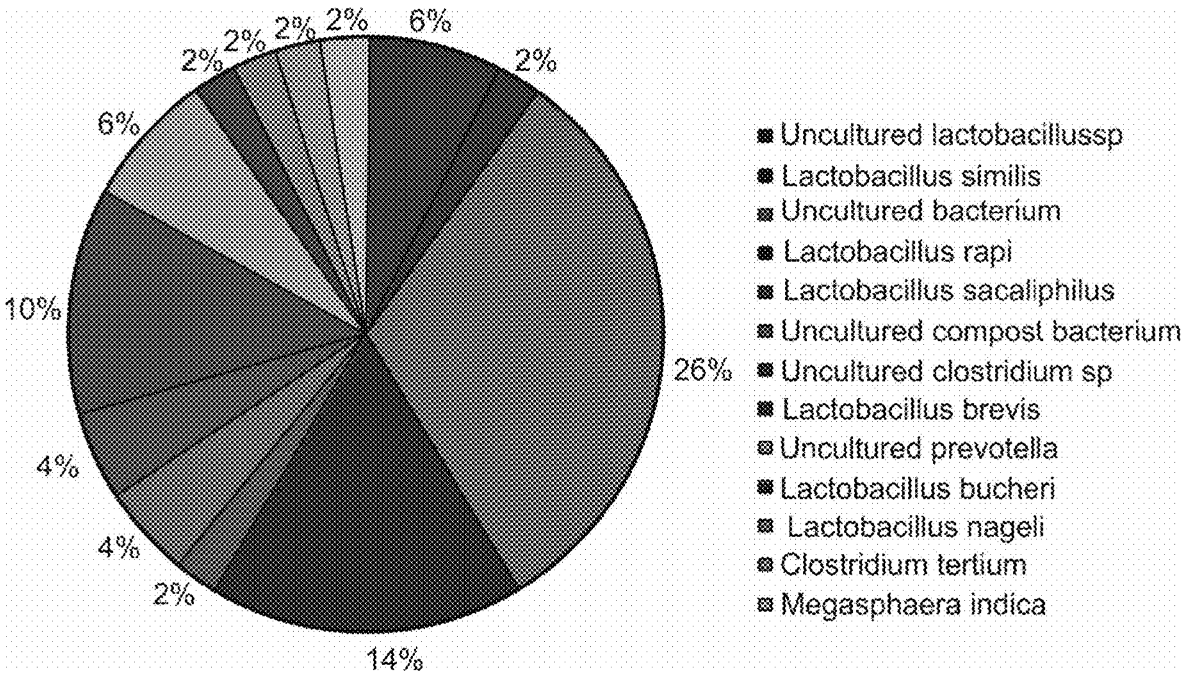
Figure 12D:
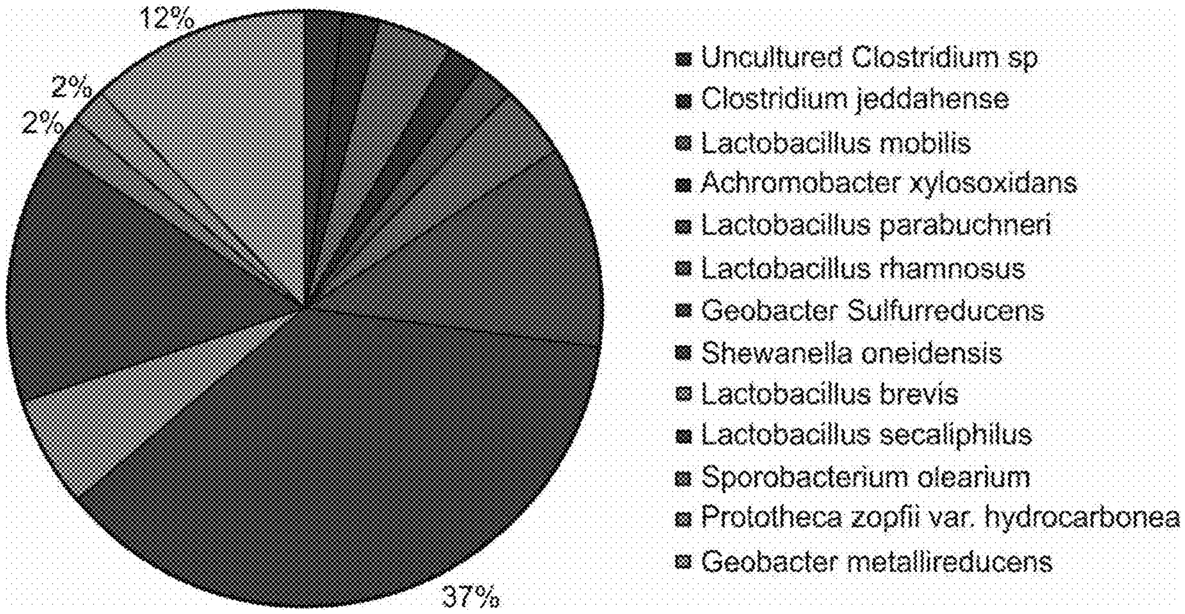

The peaks at 163.7 and 169.3 ppm were identified as sodium bicarbonate and sodium carbonate. No separate solvent peak is noticed indicating that the organic solvent utilized (acetone) also degrades or break down into carbonates and bicarbonates. The time taken to degrade PMMA waste dissolved in acetone being 6 days. FIG. 11, provides the Open Circuit Voltage (OCV) of the MECC in acetone solvent performing upto 6 days, as the OCV reached zero after 6 days, the experiment was stopped and the products were analyzed.

16s rRNA Sequencing

Bacterial DNA was isolated from MECC (TFA), MECC (ortho cresol), MECC (saturated Phenol) and MECC (Acetone) using the UltraClean® Microbial DNA Isolation Kit (MO-Bio) according to manufacture protocol. Isolated DNA was used as template for PCR amplification of approximately 1500 bp of 16S rDNA with a forward primer (27f, 5'-AGAGTTTGATCMTGGCTCAG-3', and a reverse primer (1492r,5'-GGTTACCTTTGTTACGACTT-3'. The PCR products were purified using QIA quick Gel Extraction Kit and ligated into pMD20-T vector (Takara) before they were transformed into competent *E. coli* DH5α cells (TaKaRa). The transformed cells were spread on Luria-Bertani (LB) plates containing 100 $\mu g\ ml^{-1}$ of ampicillin, 80 $\mu g\ ml^{-1}$ of X-Gal (5-bromo-4-chloro-3-indolyl-β-d-galactopyranoside) and incubated overnight at 37° C. The 98 single colonies were picked at random for re-streaking. Isolated colonies were grown overnight in 5 ml Luria Bertani Broth with 50 $\mu g\ ml^{-1}$ ampicillin at 37° C. and 250 rpm. Plasmids were isolated using EZ-10 Spin Column Plasmid DNA Minipreps Kit (Bio Basic) as per the manufacturer's instructions. Plasmids were sequenced at the Eurofins Genomics India Pvt Ltd. Sequencing was done in one direction only using the sequencing primer M13F (5'-TGTAAAACGACGGCCAGT-3') and when the amplicon in the vector was found to be in a reverse orientation, M13R (5'-CAGGAAACAGCTATGAC-3') Sequences were trimmed to remove vector sequences using the VecScreen tool (http://www.ncbi.nlm.nih.gov/tools/vecscreen/). Chimeric sequences were detected by using the CHECK_CHIMERA utility at the Ribosomal Database Project and removed from the analyses. Nearest relatives of the remaining sequences were obtained from the Genbank database by using the basic local alignment search tool (BLAST) at the NCBI website. The distribution of bacterium in the mixed culture is represented in FIG. 12.

Technical Advances and Economic Significance

The present disclosure described herein above has several technical advantages including, but not limited to, the realization of the microbial electrochemical cell for degrading plastic waste, which:

- is environment friendly as it produces no waste or harmful products;
- is simple, reliable and cost-effective;
- reduces the time required for plastic degradation;
- completely degrades plastic to value-added products; and
- is easy to scale up.

The MECC of the present disclosure is not only efficient in complete conversion of PET into ethylene glycol and TPA; PMMA into carbonates and bicarbonates; but it also helps in reducing heavy metal pollutants present in the articles made of Polyethylene terephthalate (PET) or PolyMethyl Methacrylate (PMMA) to lower oxidation states, which becomes less hazardous. The MECC of the present disclosure does not produce harmful chemicals such as dioxins, heavy metal pollutants, carbon black contaminants and ashes as pollutant in the product. In accordance to the present disclosure, the waste from anodic chamber can be used as natural fertilizer; the chemicals in the cathodic chamber can be recycled and reused; and the electrodes can be reused for many MECC cycles. Therefore, the MECC of the present disclosure is environment friendly.

The MECC of the present disclosure utilize cost effective glass bottles or tubes, however the conventional process of polyester degradation such as incineration, pyrolysis and gasification requires costly equipment.

The MECC of the present disclosure can be set up at any place without strict laboratory safety requirements. Further, the scaling up of microbial electrochemical cells is easy.

The growth of biofilm on anode by the bacterium can be controlled externally and hence the products (TPA, ethylene glycol and carbonates, bicarbonates) getting consumed by the bacterium as a natural process can be avoided.

In accordance to present disclosure, the tons of plastic waste can be degraded in a very less time ranging from hours to days compared to degradation by natural and biotechnology based pathways.

In addition to above, the cost and infrastructure advantage for microbial electrochemical cell of the present disclosure over the conventional methods of Polyethylene terephthalate (PET) and PolyMethyl Methacrylate (PMMA) degradation/recycling are:

- The enzyme in accordance to the present disclosure secreted by the microbes is enantio-specific and forms part of the biofilm. Thus, there is no need of procuring the enzymes separately.
- The initial major investments include the inoculum cost. Inoculum once added to microbial electrochemical cell, self-propagates and does not require extra investment to store and use.
- The construction of microbial electrochemical cell is simple, user friendly and scalable at any capacity and volume. Construction materials are predominantly indigenous glass bottles and tubes, and require minimal maintenance and operating cost. The simple design even allows a common human to reproduce the microbial electrochemical cell.
- The value added products obtained using the Microbial Electrochemical Cell of the present disclosure can be sold at the rate of around Rs. 10000 per gallon of ethylene glycol and Rs. 68 per kg of TPA.

The foregoing description of the embodiments have been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

One of the objects of the Patent Law is to provide protection to new technologies in all fields and domains of technologies. The new technologies shall or may contribute in the country's economic growth by way of involvement of new, efficient and quality method or product manufacturing in India.

To provide the protection of new technologies by patenting the product or process will contribute significantly towards innovation development in the country.

Further by granting patent, the patentee can contribute in manufacturing the new product or new process of manufacturing by himself/herself or by technology collaboration or through licensing.

The applicant submits that the present disclosure will contribute in country's economy, which is one of the purposes to enact the Patents Act, 1970. The product in accordance with the present invention will be in great demand in the country and worldwide due to novel technical features of the present invention, which is a technical advancement in the area of plastic degradation. The technology in accordance with present disclosure will provide product at less cost, saving time of total process of manufacturing. The saving in production time will improve the productivity, and cost cutting of the product, which will directly contribute to the economy of the country.

The product will contribute new concept in plastic recycling, wherein patented process/product will be used. The present disclosure will replace the whole concept of plastic degradation being used in the world for decades. The product is developed in the national interest and will contribute to country's economy.

While considerable emphasis has been placed herein on the components and component parts of the preferred embodiments, it will be appreciated that many embodiments are possible and that many changes can be made in the preferred embodiments without departing from the principles of the disclosure. These and other changes in the preferred embodiments as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

What is claimed is:

1. An electrochemical process for converting waste materials into chemical compounds, the electrochemical process comprising the steps of:

a. providing an electrochemical cell having an anode portion with at least one anode and a cathode portion with at least one cathode, wherein the at least one anode and the at least one cathode are connected to an electrical source;

b. providing an organic solvent containing mixed and unsorted waste within the anode portion;

c. providing a redox mediator and buffer mixture within the cathode portion;

d. heating the organic solvent containing the mixed and unsorted waste to dissolve the mixed and unsorted waste to form a solution in the anode portion;

e. cooling the solution to room temperature;

f. adding one or more bacterial strains within the cooled solution;

g. applying a constant pulse current to stimulate the one or more bacterial strains to grow as an electrically conductive biofilm on the at least one anode; and h. continuously monitoring the open circuit voltage of the electrochemical cell to estimate the growth of the biofilm and conversion of the mixed and unsorted waste into one or more compounds comprising at least one of Terephthalic acid (TPA), Ethylene Glycol (EG), a bicarbonate, or a carbonate.

2. The electrochemical process of claim 1, wherein the one or more bacterial strains comprise at least one of a species of *Geobacter*, a species of *Shewanella*, a species of *Achromobacter*, an uncultured bacterium, or a mixed culture bacteria.

3. The electrochemical process of claim 1, wherein the organic solvent comprises at least one of acetone, saturated phenol, o-cresol, nitrobenzene, chlorobenzene, or trifluoroacetic acid (TFA).

4. The electrochemical process of claim 1, wherein:

the mixed and unsorted waste comprises plastic waste, organic waste, and inorganic waste;

the organic waste comprises at least one of kitchen waste, food waste, or fruit waste; and the inorganic waste comprises at least one of radionuclides, heavy metal pollutants, sewage water waste, or tannery effluents.

5. The electrochemical process of claim 4, wherein the plastic waste is a polyester waste or an acrylic waste.

6. The electrochemical process of claim 5, wherein the polyester waste comprises at least one of polyethylene terephthalate (PET), PolyMethyl Methacrylate (PMMA), polytrimethylene terephthalate (PTT), polybutylene terephthalate (PBT), polyethylene isosorbideterephthalate (PEIT), polylactic acid (PLA), polyhydroxyalkanoate (PHA), polybutylene succinate (PBS), polybutylene succinate adipate (PBSA), polybutyleneadipate terephthalate (PBAT), polyethylene furanoate (PEF), polycaprolactone (PCL), poly (ethylene adipate) (PEA), polybutylene succinate terephthalate (PBST), polyethylene succinate (PES), or poly(butylene succinate/terephthalate/isophthalate)-co-(lactate) (PBSTIL).

7. The electrochemical process of claim 6, wherein the polyester waste is a blend or a mixture of two or more of PET, PMMA, PTT, PBT, PEIT, PLA, PHA, PBS, PBSA, PBAT, PEF, PCL, PEA, PBST, PES, or PBSTIL.

8. A microbial electrochemical cell for converting unsorted polyethylene terephthalate (PET) waste into Terephthalic acid (TPA) and Ethylene Glycol (EG) comprising:

a. an anode portion comprising at least one anode, an organic solvent containing unsorted polyethylene terephthalate (PET) waste, and one or more bacterial strains suspended within the organic solvent;

b. a cathode portion comprising at least one cathode and a redox mediator and buffer mixture; and c. an electrical pathway engaged between the anode portion and the cathode portion to selectively transfer the ions between the organic solvent containing unsorted polyethylene terephthalate (PET) waste and the redox mediator and buffer mixture, wherein the anode and the cathode are connected to an electrical source, wherein the one or more bacterial strains form an electrically conductive biofilm on the anode, wherein the organic solvent is one of trifluoroacetic acid (TFA), o-cresol, and saturated phenol, wherein the anode is a graphite anode, and the cathode is a graphite cathode, wherein the one or more bacterial strains comprise at least one of a species of *Geobacter*, a species of *Shewanella*, a species of *Achromobacter*, an uncultured bacterium, or a mixed culture bacteria, and wherein the unsorted polyethylene terephthalate (PET) waste received within the anode chamber is transformed into Terephthalic acid (TPA) and Ethylene Glycol.

* * * * *